3,445,451
REACTIVE AZO DYES
Harry W. Grimmel, Warwick Neck, and Jonas St. Alban, Greene, R.I., assignors to American Hoechst Corporation, New York, N.Y.
No Drawing. Filed Jan. 11, 1966, Ser. No. 519,969
Int. Cl. C09b 62/78, 62/84, 45/08
U.S. Cl. 260—148                     8 Claims

ABSTRACT OF THE DISCLOSURE

Reactive azo dyes having a dinaphtholamine nucleus of the formula

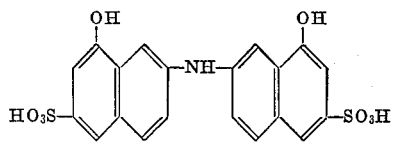

in which one of the naphthol moieties is substituted in ortho- or peri-position to the hydroxy by phenylazo substituted by $-SO_2CH_2CH_2OSO_3H$ or $-SO_2NHCOHN_2$, the phenyl thereof optionally being further substituted by chlorine, bromine, nitro, carboxylic acid, sulfonic acid, hydroxy, lower alkoxy or sulfonamide, and the other naphthol moiety optionally being substituted in ortho- or peri-position by phenylazo substituted by chlorine, bromine, nitro, $-SO_3H$, $-COOH$, hydroxy, lower alkoxy, sulfonamide, $-SO_2CH_2CH_2OSO_3H$, $-SO_2NHCONH_2$ or phenylazo-dinaphtholamino-azophenyl, as well as metal complex compounds thereof.

---

This invention relates to reactive azo dyes of the formula

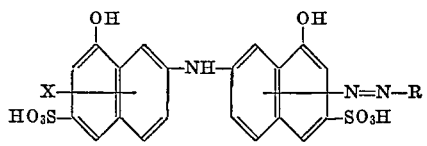

wherein R is a phenyl group substituted by $-SO_2CH_2CH_2OSO_3H$ or $-SO_2NHCONH_2$, and, if desired, by halogen, nitro, one or more water-solubilizing groups such as a carboxylic acid group or a sulfonic acid group, hydroxy, lower alkoxy, sulfonamide, or a combination thereof, lower alkoxy being preferred, and X is hydrogen or $-N=N-R'$ R' being a phenyl group substituted by halogen, especially chlorine or bromine, nitro, one or more water-solubilizing groups such as a carboxylic acid group or a sulfonic acid group, hydroxy, lower alkoxy, sulfonamide, $-SO_2CH_2CH_2OSO_3H$, $-SO_2NHCONH_2$ or a combination thereof, or phenyl substituted by a phenylazo-dinaphtholamino azophenyl forming a symmetrical tetrazo compound.

The dyes of this invention have the unique advantage of possessing sufficient affinity for vegetable, protein and polyamide fibers to be dyes without impairing their use for textile printing. They can be fixed on vegetable fibers in the presence of alkaline agents to yield dyeings or prints having very good fastness to wet processing and light. Furthermore, by proper choice of diazo component or components, as known in the art, metalliferous dyes of excellent fastness to light and chlorine can be produced.

The new dyes yield shades varying from a brownish purple to deep brown, depending upon whether the coupling reaction or reactions is or are carried out at an acid pH or a slightly alkaline pH. It is also possible to effect one coupling at an acid pH and a second coupling at an alkaline or neutral pH, or vice versa, to provide additional variants to the shades desired. Heretofore it has not been possible to obtain a truly brown shade in fiber-reactive dyes based on vinyl sulfone esters which are capable of meeting simultaneously the requirements of the textile dyer and also the printer. The dyestuffs of this invention meet these requirements.

Another outstanding advantage of the dyes of this invention is their easy dischargeability on the fiber with reducing agents such as sodium hydrosulfite or the like, thereby leaving a completely white background. Equally valuable is their generally good stability towards chlorine bleach liquors applied in the strength customary in normal washing processes.

Because of the ability of the vinyl sulfone reactive dyes of this invention to react not only with the hydroxyl groups of cellulosic materials but also with amines, the dyes of the invention are also suitable for the fast dyeing and printing of wool and polyamide fibers.

The coupling component that is utilized in forming the dyes of this invention, the disodium salt of 8,8'-dihydroxy-2,2'-dinaphthylamine-6,6'-disulfonic acid, can be made readily and inexpensively in the manner disclosed in German Patent No. 121,094 (Friedlaender VI, 199).

The following examples illustrate a number of the dyes of this invention and their mode of preparation.

EXAMPLE 1

5.04 g. (0.01 mol) of the disodium salt of 8,8'-dihydroxy-2,2'-dinaphthylamine-6,6'-disulfonic acid are dissolved neutral in 50 ml. water. The pH is increased to pH 7.3 by addition of 4 g. sodium bicarbonate in concentrated solution. This is followed by slow addition thereto of a diazo component prepared by dissolving 5.64 g. (0.02 mol) of the sulfuric acid ester of 1-aminobenzene-4-β-hydroxyethyl sulfone in 50 ml. water, adding 2 ml. of 36% hydrochloric acid and diazotizing at 0–5° C. with 4 ml. 20% sodium nitrite solution. Coupling proceeds rapidly. After one hour, 3 ml. hydrochloric acid and 25 g. potassium chloride are added.

The dye thus precipitated is filtered, washed with 40 ml. saturated potassium chloride solution and dried. In its free acid form it has the formula

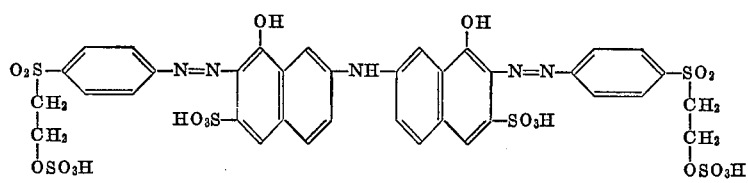

This dye yields, when dyed or printed on cellulose fibers, a full chocolate brown hue of excellent wet processing properties and very good fastness to light.

EXAMPLE 2

By proceeding as described in Example 1 but coupling at a pH of 3 instead of 7.3, a dye is obtained which, in its free acid form, has the formula

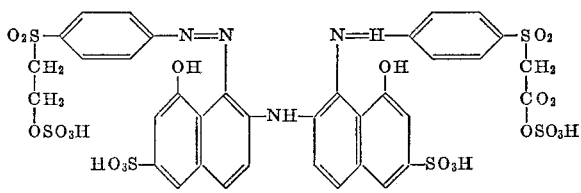

When dyed or printed on natural fibers, this dye yields a rich violet-brown hue of excellent fastness to wet processing and very good fastness to light.

EXAMPLE 3

By proceeding as in Example 1 but combining equimolar amounts of the coupling and diazo components at a pH of 7.35, the resulting dye has, in its free acid form, the formula

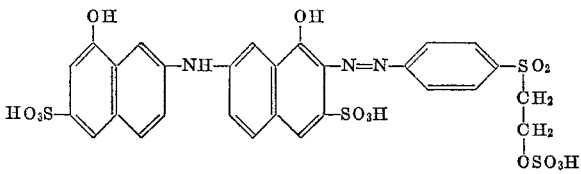

On cellulose fibers, this dye yields a full and pleasing chocolate brown shade of good fastness to light and good fastness to wet processing.

EXAMPLE 4

By proceeding as in Example 1 but combining equimolar amounts of the coupling and diazo components at a pH of 3, the resulting dye has, in its free acid form, the formula

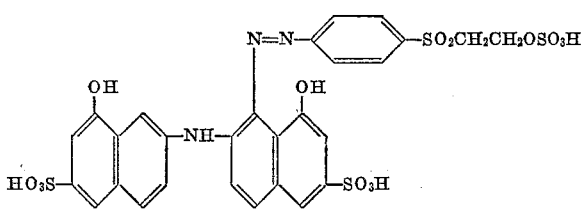

On cellulose fibers, this dye yields a reddish purple shade of good fastness to light and good fastness to wet processing.

EXAMPLE 5

The coupling component solution prepared as described in Example 1 is adjusted to a pH of 3.0 with concentrated hydrochloric acid and combined with an equimolar amount of the same diazo component at 0° C. After completion of this coupling, the pH is increased to 7.3 by addition of sodium bicarbonate solution and a second solution, again containing an equimolar amount of the same diazo component, is added. The combination proceeds rapidly at 5 to 10° C. and is complete within one hour. The pH is then adjusted to 3.0 by addition of hydrochloric acid and the dye is salted out with potassium chloride. In its free acid form it has the formula

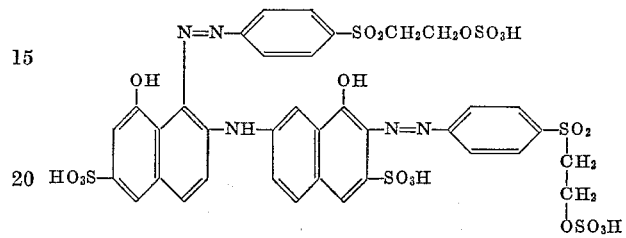

After filtering, washing with a saturated potassium chloride solution and drying, this dye yields, when dyed or printed on cellulose fibers, a full brown shade that is redder than that of the dye of Example 1 but possesses the same excellent wet processing properties and very good fastness to light.

EXAMPLE 6

Equimolar (0.1 mol) amounts of the coupling and diazo components described in the previous examples are combined while maintaining the pH at 6.5 to 7. The combination proceeds rapidly. When it is complete, 17 g. sodium bicarbonate are added. This is followed by addition, at a pH of 7, of a solution of an equimolar amount (0.1 mol) of a diazo component prepared by diazotization of 4-nitraniline-2-sulfonic acid. When the coupling is complete, the pH is reduced to 5.5 by addition of hydrochloric acid and the dye is salted out with 150 g. salt, filtered and dried. In its free acid form it has the formula

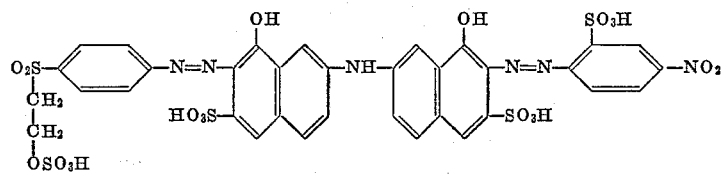

When applied to cellulose fibers in the manner customary for reactive dyes of this type, it yields a chocolate brown shade of good fastness to wet processing and good fastness to light.

EXAMPLE 7

By proceeding as described in Example 6 but replacing the second diazo component with a corresponding amount of diazotized p-chloroaniline, a dye having, in its free acid form, the formula

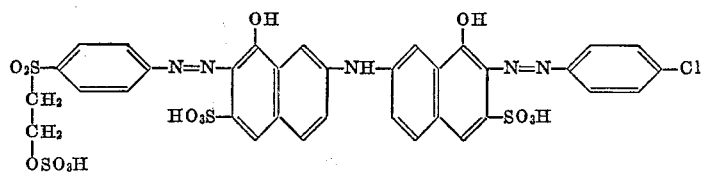

is obtained. It yields a shade of more olive-brown cast and possesses good fastness to wet processing and to light.

EXAMPLE 8

By proceeding as described in Example 1 but replacing the diazo component with a corresponding amount of diazotized p-aminophenyl sulfonyl urea, a dye having, in its free acid form, the formula

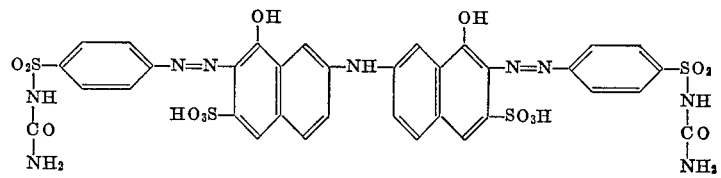

is obtained. When heat-developed on cellulose fibers by known procedures unique for this type of fiber-reactive dye, it yields a hue of somewhat yellower shade than that produced by the dye of Example 1. It excels, however, in unsurpassed fastness to wet processing and has very good fastness to light.

EXAMPLE 9

5.04 g. (0.01 mol) of the disodium salt of 8,8'-dihydroxy-2,2'-dinaphthylamine-6,6'-disulfonic acid are dissolved neutral in 50 ml. water. After addition of 6 g. sodium bicarbonate, a solution of 0.02 mol diazotized sulfuric acid ester of 2-amino anisol-5-β-hydroxyethyl sulfone are added. The coupling proceeds leisurely. After ten hours, the pH is reduced to 3.5 with formic acid and then a solution of 6.25 g. copper sulfate in 35 ml. water is added. The temperature is raised to 60–70° C. and maintained at that level for four hours. The copper complex of the dye is then salted out by addition of 100 g. potassium chloride, filtered cold, and the filter cake is washed with 200 ml. of a saturated potassium chloride solution. The dye may be represented in its free acid form by the formula

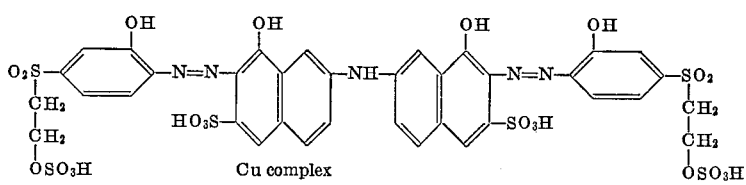

The dried powder, when applied to cellulose fibers in the manner customary for reactive dyes of this type, yields a full, pleasing chocolate-brown hue of good fastness to wet processing and very good fastness to light.

EXAMPLE 10

By proceeding as in Example 9 but substituting for the diazo component a corresponding amount of diazotized sulfuric acid ester of 2-amino-1,4-dimethoxy benzene-5-β-hydroxyethyl sulfone, a dye having, in its free acid form, the formula

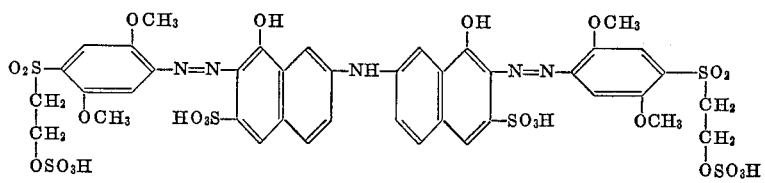

is obtained.

Metallization with copper sulfate as described in Example 9 forms a dye which yields, on wool, polyamide and cellulosic textiles, full reddish brown shades of very good fastness to wet processing and very good fastness to light.

EXAMPLE 11

5.04 g. (0.01 mol) of the disodium salt of 8,8'-dihydroxy-2,2'-dinaphthylamine-6,6'-disulfonic acid are dissolved neutral in 50 ml. water. After addition of 6 g. sodium bicarbonate, a solution of 0.01 mol diazotized sulfuric acid ester of 2-amino anisol-5-β-hydroxyethyl sulfone is added. After completion of this coupling, a solution of 0.01 mol diazotized 2-aminophenol-5-sulfonamide is added. This second coupling is completed overnight. The volume is about 500 ml. The pH is then reduced to 3.4 by addition of formic acid and a solution of 6.2 g. copper sulfate in 35 ml. water is added. The temperature is raised to 75° C. and maintained at that level for four hours. The copper complex of the dye, which in its free acid form has the formula

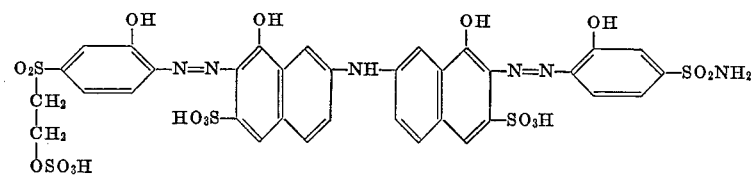

is salted out by addition of 100 g. potassium chloride, filtered cold, and washed with 200 ml. of a saturated potassium chloride solution.

The dried powder, when applied to cellulosic fibers, yields full reddish brown shades of very good fastness to wet processing and very good fastness to light.

EXAMPLE 12

6 g. sodium bicarbonate are added to a neutral solution of 5.04 g. (0.01 mol) of the disodium salt of 8,8'-dihydroxy-2,2'-dinaphthylamine-6,6'-disulfonic acid in 50 ml. water and ice. This is followed by slowly adding 1.72 g. (0.005 mol) tetrazotized benzidine-2,2'-disulfonic acid, the pH being kept at between 6 and 7 by adding about 2 g. sodium bicarbonate. After the coupling is complete, a solution of 2.81 g. (0.01 mol) diazotized sulfuric acid ester of 1-aminobenzene-4-β-hydroxyethyl sulfone is added. This coupling is finished at a pH of 6.9 within two hours. The dye does not require salting out and can be filtered cold. The filter cake is washed with 200 ml. of a 10% potassium chloride solution and dried.

The dye, which in its free acid form has the formula

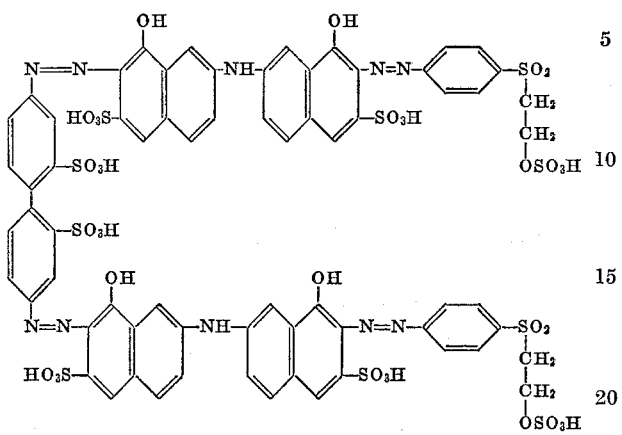

yields a chocolate brown shade of good wet processing properties and fastness to light when printed on cotton or rayon.

We claim:
1. An azo dye having, in its free acid form, the formula

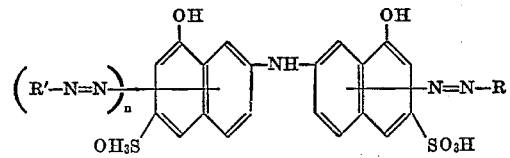

wherein —N=N—R is substituted in ortho- or peri-position to the hydroxy, R is phenyl substituted by —SO$_2$CH$_2$CH$_2$OSO$_3$H or —SO$_2$NHCONH$_2$ with any further substituents being chlorine, bromine, nitro, —COOH, —SO$_3$H, hydroxy, lower alkoxy or sulfonamide,

—N=N—R' is substituted in ortho- or peri-position to the hydroxy, R' is phenyl substituted by chlorine, bromine, nitro, —SO$_3$H, —COOH, hydroxy, lower alkoxy, sulfonamide,

—SO$_2$CH$_2$CH$_2$OSO$_3$H or —SO$_2$NHCONH$_2$, and $n$ is 0 to 1, or a copper complex thereof.

2. An azo dye which, in its free acid form, has the formula

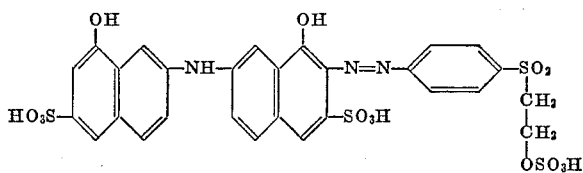

3. An azo dye which, in its free acid form, has the formula

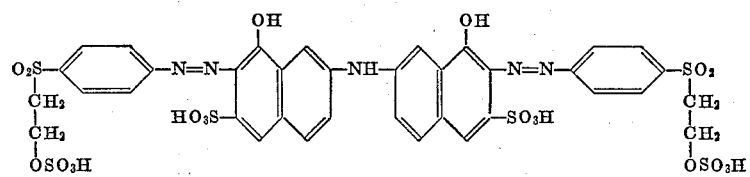

4. An azo dye which, in its free acid form, has the formula

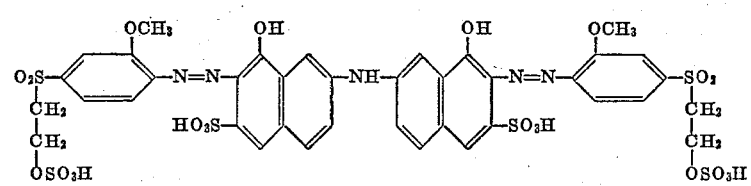

5. A copper complex of the dye defined in claim 4.
6. An azo dye which, in its free acid form, has the formula

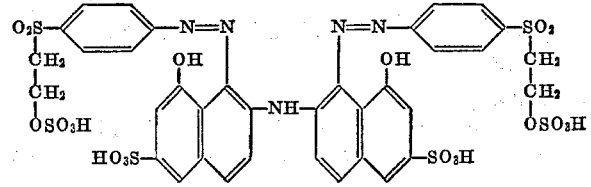

7. An azo dye which, in its free acid form, has the formula
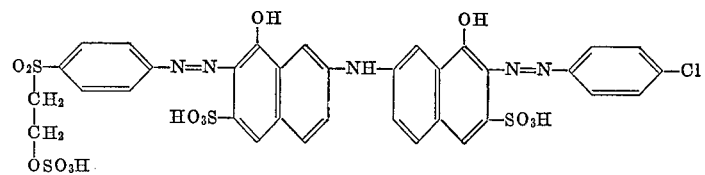
8. An azo dye which, in its free acid form, has the formula
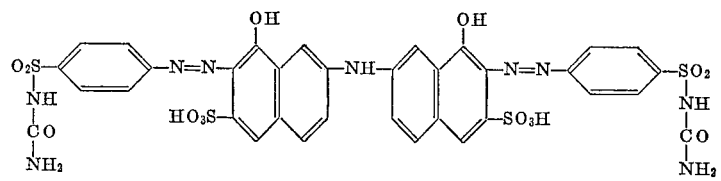
References Cited
UNITED STATES PATENTS
2,670,265  2/1954  Heyna et al. _____ 260—152
CHARLES B. PARKER, *Primary Examiner.*
DONALD M. PAPUGA, *Assistant Examiner.*
U.S. Cl. X.R.
8—41, 54.2; 260—15, 37, 168, 184, 198